United States Patent
Tikhonov et al.

(10) Patent No.: US 10,918,969 B2
(45) Date of Patent: Feb. 16, 2021

(54) VERTICAL DESUBLIMATION APPARATUS FOR CRYSTALLINE IODINE PRODUCTION

(71) Applicants: Serguei Tikhonov, Bremen (DE); Lia Neumann, The Woodlands, TX (US)

(72) Inventors: Serguei Tikhonov, Bremen (DE); Lia Neumann, The Woodlands, TX (US); Yusub Ishangulyyev, Ashgabat (TM)

(73) Assignees: Serguei Tikhonov, Bremen (DE); Lia Neumann, The Woodlands, TX (US)

( * ) Notice: Subject to any disclaimer, the term of this patent is extended or adjusted under 35 U.S.C. 154(b) by 0 days.

(21) Appl. No.: 16/662,519

(22) Filed: Oct. 24, 2019

(65) Prior Publication Data
US 2020/0129881 A1    Apr. 30, 2020

(51) Int. Cl.
*B01D 7/02*  (2006.01)
*C01B 7/14*  (2006.01)

(52) U.S. Cl.
CPC . *B01D 7/02* (2013.01); *C01B 7/14* (2013.01)

(58) Field of Classification Search
CPC .................................... B01D 7/02; C01B 7/14
See application file for complete search history.

(56) References Cited

U.S. PATENT DOCUMENTS

| | | | | |
|---|---|---|---|---|
| 3,710,854 A * | 1/1973 | Staub | .................. | F28B 1/06 165/111 |
| 5,415,224 A * | 5/1995 | Koch | .................. | B01D 5/0036 165/111 |
| 6,818,044 B1 * | 11/2004 | Nakahara | .................. | B01D 7/02 55/282.5 |
| 8,496,815 B2 | 7/2013 | Brix et al. | | |
| 2008/0083605 A1 * | 4/2008 | Holtzapple | .................. | C02F 1/041 203/11 |
| 2008/0131230 A1 * | 6/2008 | Burgstein | .................. | F02B 29/0456 411/342 |
| 2010/0119438 A1 | 5/2010 | Becker et al. | | |
| 2018/0320964 A1 * | 11/2018 | Baxter | .................. | B01D 5/003 |

OTHER PUBLICATIONS

Stern and Stern. Teflon Fabric. Internet Archive Wayback Machine screen grab from Mar. 9, 2018. (Year: 2018).*

* cited by examiner

*Primary Examiner* — Donald R Spamer
(74) *Attorney, Agent, or Firm* — Renner, Otto, Boisselle & Sklar, LLP

(57) ABSTRACT

Vertical desublimation apparatus for crystalline iodine production, comprising: a gas intake, through which vapor can be fed into the apparatus, and a gas exhaust, through which residual air can be discharged; at least one downstream duct comprising a downstream duct inlet and a downstream duct outlet, wherein the intake is fluidically connected to the downstream duct inlet; at least one upstream duct comprising an upstream duct inlet and an upstream duct outlet, wherein the exhaust is fluidically connected to the upstream duct outlet; at least one downstream condenser pipe arranged adjacent to the downstream duct and at least one upstream condenser pipe arranged adjacent to the upstream duct, wherein a cooling medium can be fed through the condenser pipes; a collecting receptacle for collecting crystallized iodine and liquid water arranged at the bottom of the apparatus, fluidically connecting the downstream duct outlet and the upstream duct inlet, the collecting receptacle having a bottom outlet.

17 Claims, 2 Drawing Sheets

Figure 1:
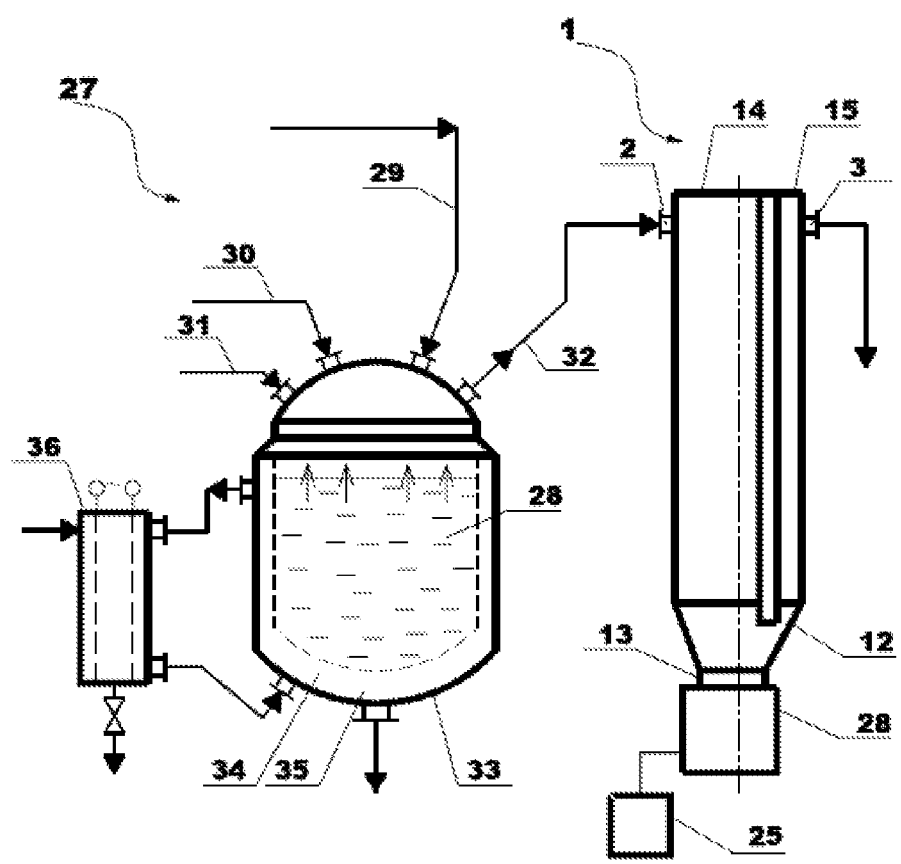

VERTICAL DESUBLIMATION APPARATUS FOR CRYSTALLINE IODINE PRODUCTION

The present invention is related to a vertical desublimation apparatus for crystalline iodine production and a method for crystalline iodine production.

BACKGROUND OF THE INVENTION

The invention provides an apparatus design for the production process of crystalline iodine through the sublimation-desublimation method. The goal of the invention is to improve the iodine sublimation-desublimation process to obtain a product of the desired quality and granulometric composition. Elemental iodine or diatomic iodine is a valuable chemical having many industrial and medicinal applications. There is an increasing demand for iodine and its major derivatives, iodide salts. The consumption of iodine and iodide salts is distributed among several industrial applications, such as catalysts, animal feed additives, stabilizers for nylon resins, inks and colorants, pharmaceuticals, disinfectants, film, and other uses. Much attention is therefore focused on the recovery of iodine from various sources, either as a primary product or as a by-product of other industrial processes.

Iodine has been isolated from gas well brine for a long time. The brine is pumped from a number of gas wells over many miles to a centralized processing facility. In that facility, the iodide rich brine is acidified and oxidized to obtain elemental iodine.

However, elemental iodine recovered in accordance with methods of the prior art often suffers from low purity and the yields of elemental iodine achieved by the methods of the prior art are rather poor.

It is therefore, the object of the present invention to provide an apparatus and a method for recovering iodine overcoming drawbacks of the prior art, in particular increasing the productivity of crystalline iodine production and allowing to recover the elemental iodine in improved yields and with improved purity.

DESCRIPTION OF THE INVENTION

The above object is achieved by the features of the independent claims. Further advantageous configurations are described in the dependent claims.

The vertical desublimation apparatus for crystalline iodine production according to the invention can comprise a gas intake, through which in particular water and iodine vapor can be fed into the apparatus, and a gas exhaust, through which in particular residual air can be discharged. The apparatus further can comprise at least one downstream duct comprising a downstream duct inlet and a downstream duct outlet, wherein the intake is fluidically connected to the downstream duct inlet, at least one upstream duct comprising an upstream duct inlet and an upstream duct outlet, wherein the exhaust is fluidically connected to the upstream duct outlet. Furthermore, the apparatus can comprise at least one downstream condenser pipe arranged immediately adjacent to the downstream duct and at least one upstream condenser pipe arranged immediately adjacent to the upstream duct, wherein a cooling medium can be fed through the condenser pipes. In addition, the apparatus can comprise a collecting receptacle for collecting crystallized iodine and liquid water arranged at the bottom of the apparatus, fluidically connecting the downstream duct outlet and the upstream duct inlet, the collecting receptacle having a bottom outlet.

For example, the ducts and/or the condenser pipes can consist of sheet metal comprising titanium. This is advantageous because titanium is particularly resistant to corrosion by iodine.

In particular, the inner surface of the downstream and the upstream ducts and/or the outer surface of the condenser pipes can be covered with heat-resistant elastic material. Heat resistance of the elastic material is necessary because the surfaces are permanently exposed to hot iodine vapor. In addition, the material may have a high non-stick tendency.

Further, the heat-resistant material can comprise a fluoroplastic fabric film, in particular PTFE, capable of withstanding the temperature of up to +250° C. The advantage here is that PTFE can adhere to the ducts or condensers on the one hand, but on the other hand offers practically no adhesion for the iodine crystals.

Furthermore, the heat resistant elastic material can have a thickness of preferably 100-300 μm, more preferably 150-250 μm, still more preferably 200 μm.

Moreover, cold air can be passed through the condenser pipes and discharged into the atmosphere at the other end of the pipes. The air can be compressed. Also, the air can be fed through the pipes under a low pressure. The condenser pipe air inlets and air outlets can be positioned at the top of the apparatus. For this purpose, the pipes can essentially have a U-shape. The particular condenser pipes can have common inlet and outlet lines. Alternatively, the separate inlet lines and outlet lines can be provided for the downstream section on the one hand and the upstream section on the other hand.

The at least one downstream duct and the at least one downstream condenser pipe can define a downstream section and the at least one upstream duct and the at least one upstream condenser pipe can define an upstream section, the downstream section and the upstream section can be connected at a distance from each other by means of titanium plates. The downstream section and the upstream section can be arranged parallel to each other, each section comprising essentially straight ducts and essentially straight condenser pipes.

Further, the collecting receptacle can be a hopper, wherein the hopper opening is arranged below the downstream duct outlets respectively the upstream duct inlets and pointing to them. The hopper opening can have an opening diameter which corresponds to the added diameters of all downstream ducts and pipes and all upstream ducts and pipes plus the distance between the downstream and the upstream section. The hopper can have downward facing surfaces and a bottom outlet nozzle arranged at the lower end of the surfaces through which falling iodine crystals and condensed water are transported into a container positioned below the outlet nozzle.

The apparatus can comprise an, in particular electric, vibrator, the vibrator periodically removing crystalline iodine deposited on the inner surface of the downstream and upstream ducts and/or the outer surface of the condensers, the removed crystalline iodine being fed into the collecting receptacle. The installation of the vibrator in the lower part of the frame of the desublimator allows removing iodine crystals from the surface of the PTFE fabric into the receiving hopper automatically.

The gas intake can comprise a fluoroplastic pipe which is connected to the top part of the apparatus, the pipe comprising separate fluid connections for each of the at least one downstream duct inlet. The advantage of fluoroplastic as pipe material is that the adhesion of the iodine is already made more difficult before entering the actual condensing section and no incrustations occur, so that the system is particularly easy to maintain.

The downstream section can comprise four downstream ducts and three downstream condenser pipes. It is also possible that the downstream section comprises 1 to n ducts and n−1 downstream condenser pipes but at least one condenser pipe.

Further, the upstream section can comprise two upstream ducts and one upstream condenser pipe. It is also possible that the upstream section comprises more than 1 to n ducts and n−1 downstream condenser pipes but at least one condenser pipe. It is in particular economically advantageous if the upstream section comprises less ducts and/or condenser pipes than the downstream section since a large part of the vapor is already condensed in the downstream section.

In particular, the apparatus can be suspended in a holding frame which is resiliently mounted on the ground. The holding frame can comprise a bottom plate which can be positioned at the level of the bottom outlet of the collecting receptacle. The bottom plate can be fastened to the ground via coil springs. The vibrator can be attached to the bottom plate. By activating the electrical vibrator periodically iodine crystals from the surface of the PTFE fabric can be fed into the receiving hopper automatically.

Furthermore, the apparatus can comprise fans for blowing against the outer walls of the apparatus in order to intensify the condensation process. This can be used to support the condensation process, especially at high outside temperatures.

The invention also concerns a method for producing crystallized iodine, comprising the steps:

feeding vapors of water and iodine from an evaporator to a desublimation apparatus at a temperature of 114-184° C., the iodine vapor having a partial pressure lower than the pressure of saturated iodine vapor in the triple point;

passing the vapors through a duct of the apparatus, thereby condensing the vapors;

removing crystalline iodine deposited on the inner surface of the duct.

After exiting the sublimator vapors of water and iodine can be fed through a fluoroplastic pipe to the top part of the desublimation apparatus. The vapor then can be passed through several, for example four, inlets and fed into the downstream ducts. Condenser pipes can be arranged immediately adjacent, for example in, the downstream ducts. There, the vapors get deposited on a fluoroplastic, for example PTFE, surface of condensers and the internal surface of the downstream ducts, also covered with a PTFE varnished fabric. After passing the downstream ducts the vapor passes the collecting receptacle. The remaining and not yet condensed vapor will then fed into the upstream ducts. Also here, condenser pipes can be arranged immediately adjacent, for example in, the upstream ducts. By using a multiplicity of downstream and upstream ducts with respective condenser pipes simultaneously a large surface for condensation is provided and therefore a high condensation rate is achieved. The water condensed at the surfaces of the condenser pipes flows down into the collecting receptacle and the moist crystalline iodine deposited on the PTFE-covered walls of the apparatus are periodically shaken off into the receiving hopper by tapping the outer surface of the material or, more preferably by activating the electric vibrator.

Water flows out through the outlet in the bottom of the receiver and is separated from iodine. The resulting moist iodine can be used together with the iodine paste when they are loaded for the next sublimation operation. The iodine-containing water condensate is discharged into the container and can be fed into the sorbent reservoir at the iodine absorption stage, and the remaining moist iodine in the container can be returned to be loaded along with the iodine paste for the next operation.

After distillation of the water is complete and the iodine melts, the evaporator can be supplied with air. A part of the air can be sprayed through the iodine melt to saturate it with iodine vapor. The rest of the air can be fed to the top of the evaporator. Due to dilution with air, the partial pressure of iodine vapor in the iodine-air mixture before desublimation is reduced to a pressure lower than the pressure of saturated iodine vapor in the triple point, for example to 87 mm Hg, thus providing high-quality crystals of the finished product.

In order to intensify the condensation process and for example during the hot weather season the outer walls of the desublimator can be blown off by means of mobile fans.

DETAILED DESCRIPTION OF THE INVENTION

Figure 2:
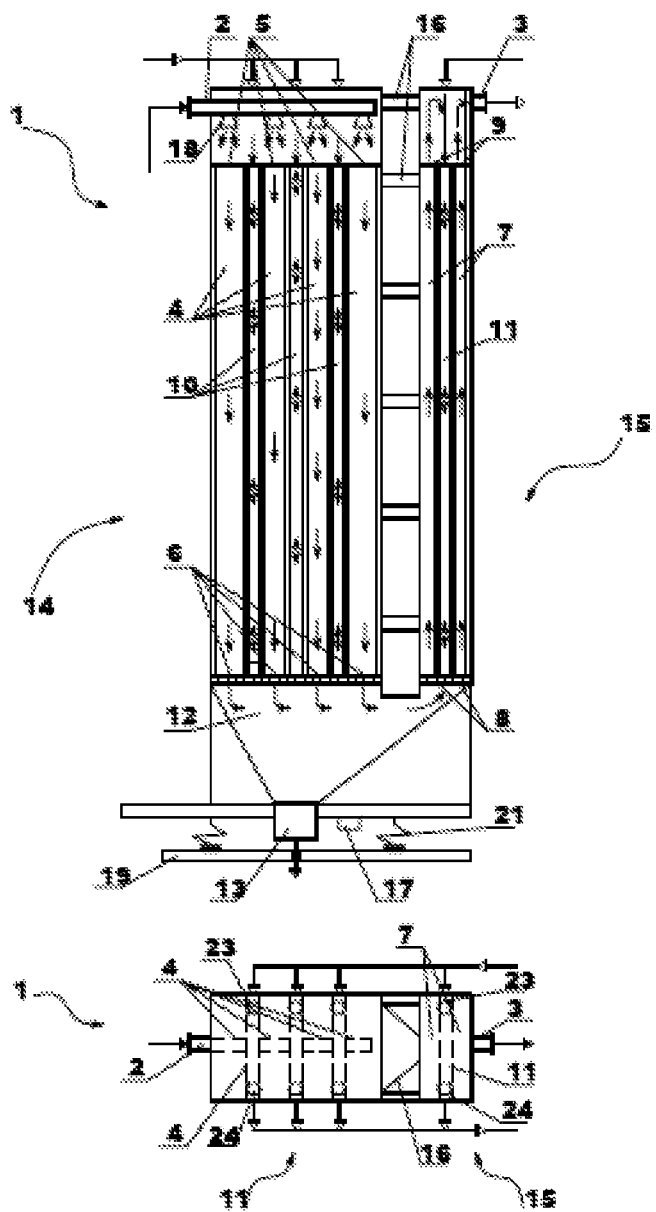

Further characteristics, advantages and features of the invention are indicated in the following description of preferred embodiments of the invention by means of the accompanying drawing in which show:

FIG. 1 an overview of a sublimation-desublimation process in a side view and a top view;

FIG. 2 a detailed display of a desublimation apparatus.

In the sublimation-desublimation process shown in FIG. 1 iodine paste extracted from a sorbent is fed to a sublimation device 27 by an iodine supply 31. The iodine has not pre-dried or wringed on a press. In the evaporator 27 dehydration of iodine paste 28 is carried out by evaporation of water at the first stage of iodine sublimation. The sublimation process is carried out at atmospheric pressure in an enameled container 33 with a jacket 34 which is filled with a high-temperature coolant 35. The coolant having a boiling point not lower than +250° C., which is heated by electric heating elements 36 to a temperature of +150-200° C. Before sublimation, sodium carbonate is added to the iodine paste 28 which is fed into the evaporator 27 through a sodium carbonate supply 31. The amount of sodium carbonate fed into the evaporator 27 is adjusted such that at least 4.0 pH of water condensate is provided. When iodine paste is heated, water and iodine distillation begins. The evaporator preferably has a volume of 3 m³.

The mixture of water and iodine vapor 32 then is fed into the desublimation apparatus 1 by gas intake 2. The vapor 32 condenses on the surface of the condenser pipes 10, ii of the desublimator 1 which are covered with a heat-resistant elastic material. The condensed water flows down from the surface of the condenser and crystalline iodine is periodically shaken off from the inner surface of the elastic material into the receiver 26. Water flows out through the outlet in the bottom of the receiver 26 and is separated from iodine. The resulting moist iodine is used together with the iodine paste for the next sublimation operation. The process of dehydrated iodine sublimation at the first stage is carried out at the iodine vapor temperature of 114-184° C. After the distillation process of the water is complete and the iodine melts, the evaporator 27 is supplied with air through air supply 29. A part of the air is sprayed through the iodine melt 28 to saturate it with iodine vapor, the rest of the air is fed to the top of the evaporator respectively sublimator 27. Due to the dilution with air, the partial pressure of iodine vapor in the iodine-air mixture 32 before desublimation is reduced to a pressure lower than the pressure of saturated iodine vapor in the triple point of iodine (90.53 mm Hg), for example to 87 mm Hg, thus providing high-quality crystals of the finished product.

The vertical desublimation apparatus 1 is a surface cooling unit with a flexible surface made of fluoroplastic fabric stretched on a titanium frame. Structurally, the apparatus is divided into a downstream working section 14 and an upstream idle section 15. Both parts 14, 15 are connected by a product hopper 12. The iodine-containing water condensate is discharged into the container 25 and is fed into the sorbent reservoir at the iodine absorption stage, and the remaining moist iodine in the container 25 is returned to be loaded along with the iodine paste for the next operation. The duration of water and wet iodine distillation is about 24 hours. The distillation time of dry iodine is about 40 hours. The duration of one operation, from the day of loading the sublimator 27 with initial components, sublimation-desublimation process, the production of crystalline iodine and the devices cooling off to a temperature of +40-50° C. is about 3-4 days.

FIG. 2 shows a detailed display of the vertical desublimation apparatus 1 which essentially consists of a downstream section 14, an upstream section 15 and a collecting receptacle 12. Vapor of water and iodine is fed into the apparatus 1 by gas intake 2 which is a PTFE pipe having four fluid connections each of which is connected with one downstream duct inlet 5. The downstream section 14 defines the part of the apparatus 1 in which the vapor moves in a vertically downward direction. After leaving the downstream section 14 through the downstream duct outlets 6 the vapor passes the collecting receptacle 12 which at its upper edge is fluidically tightly connected to the outlet area of the downstream section 14 and the inlet area of the upstream section 15, so that no vapor can escape there. The downstream ducts 4 are vertically arranged and each define a chamber through which the vapor is passed. Between the downstream ducts condenser pipes 10 are arranged which separate the particular ducts 4. The outer surfaces of the condenser pipes 10 and the inner surfaces of the downstream ducts 4 are covered with an elastic and heat resistant material, in particular PTFE, to simplify the removal of iodine crystals. The condenser pipes 10 each comprise a condenser pipe intake 23 and a condenser pipe exhaust 24 through which cold air is lead in and out of the pipes 10, whereby the intakes 23 and the exhausts 24 are arranged at the top of the apparatus 1. At the bottom of the apparatus a collecting receptacle 12 in particular a product hopper is positioned which connects the downstream section 14 and the upstream section 15. The vapor passes through the collecting hopper 12 as it moves from the downstream section 14 to the upstream section 15. In addition, the downstream section 14 and the upstream section 15 are fastened to each other at a distance by titanium plates 16 which are part of the holding frame 19 which suspends the apparatus 1. The upstream section 15 essentially comprises the same elements as the downstream section 14. The upstream section 15 has two upstream ducts 7 with an upstream duct inlet 8 each at the collecting receptacle 12 side and an upstream duct outlet 9 each at the gas exhaust side 3 respectively at the top of the apparatus 1. An upstream condenser pipe 11 is arranged between the two upstream ducts 7. As on the downstream section side, the outer surfaces of the upstream condenser pipes 11 and the inner surfaces of the upstream ducts 7 are covered with the elastic and heat resistant material, in particular PTFE, to simplify the removal of iodine crystals. Upstream condenser pipe 11 has an intake 23 for cold air which passes the condenser pipe and leaves it at the exhaust 24. The combined condensation surface for iodine crystal water vapor deposition of the downstream and the upstream section 14, 15 preferably is 34 m². In particular providing a condenser 11 in the upstream flow of the apparatus 1 will increase the rate of water and iodine vapor condensation in this part of the device and minimize the iodine vapor content fed to the desublimator outlet 3. Compared to known devices the disclosed new desublimator design will allow increasing the effectiveness by 2-3 times for the purposes of crystalline iodine production corresponding to the world standards of LR grade iodine.

The apparatus is suspended by holding frame 19 which comprises a base plate which is resiliently mounted to the ground and suspended by coil springs 21. An electrical vibrator 17 is attached to the base plate and is used to periodically shake off the iodine crystals from the PTFE surfaces which then are collected by the product hopper 12 and passed over to the receiver 26 shown in FIG. 1 through the bottom outlet 13. The installation of the electric vibrator in the lower part of the bed of the desublimation apparatus allows to remove iodine crystals from the surface of the PTFE fabric into the receiving hopper automatically.

The features disclosed in the foregoing description, in the claims and the accompanying drawings may, both separately or in any combination, be material for realizing the invention in diverse forms thereof.

REFERENCE LIST 1 vertical desublimation apparatus
2 gas intake
3 gas exhaust
4 downstream duct
5 downstream duct inlet
6 downstream duct outlet
7 upstream duct
8 upstream duct inlet
9 upstream duct outlet
10 downstream condenser pipe
11 upstream condenser pipe
12 collecting receptacle
13 bottom outlet
14 downstream section
15 upstream section
16 plates
17 vibrator
18 fluid connections
19 holding frame
20 fans
21 springs
22 PTFE pipes
23 condenser intake
24 condenser exhaust
25 container
26 receiver
27 evaporator
28 iodine paste
29 air supply
30 sodium carbonate supply
31 iodine paste supply
32 vapor of iodine and water
33 enameled container 34 jacket
35 high temperature coolant
36 electric heating element

The invention claimed is:

1. Vertical desublimation apparatus (1) for crystalline iodine production, comprising:
   a gas intake (2), through which water and iodine vapor can be fed into the apparatus (1), and a gas exhaust (3), through which residual air can be discharged;
   a plurality of upstream ducts (4) each comprising an upstream duct inlet (5) and an upstream duct outlet (6), wherein the intake (2) is fluidically connected to the upstream duct inlets (5);
   a plurality of downstream ducts (7) each comprising downstream duct inlet (8) and downstream duct outlet (9), wherein the exhaust (3) is fluidically connected to the downstream duct outlets (9);
   at least one upstream condenser pipe (10) arranged immediately adjacent to the upstream ducts (4) and at least one downstream condenser pipe (11) arranged immediately adjacent to the downstream ducts (7), wherein the at least one upstream condenser pipe has a condenser intake on one side of the apparatus and a condenser exhaust on an opposite side such that a cooling medium can be fed through the condenser pipe (10) in a transverse cross-wise direction relative to a direction of flow of the water and iodine vapor travelling through the upstream ducts; and wherein a cooling medium can be fed through the at least one condenser pipe 11;
   a collecting receptacle (12) for collecting crystallized iodine and liquid water arranged below the upstream duct outlets (6) and the downstream duct inlets (9), fluidically connecting the upstream duct outlets (6) and the downstream duct inlets (8), the collecting receptacle (12) having a bottom outlet (13),
   wherein the ducts (4, 7) and/or the condenser pipes (10, 11) are formed of metal comprising titanium, and wherein the plurality of upstream ducts (4) and the at least one upstream condenser pipe (10) define an upstream section (14) and the plurality of downstream ducts (7) and the at least one downstream condenser pipe (12) define an downstream section (15), the upstream section (14) and the downstream section (15) being connected at a distance from each other with titanium plates (16).

2. Vertical desublimation apparatus (1) according to claim 1, wherein the inner surface of the upstream and the downstream ducts (4, 7) and/or the outer surface of the condenser pipes (10, 11) is covered with a heat-resistant elastic material.

3. Vertical desublimation apparatus (1) according to claim 2, wherein the heat-resistant material comprises a fluoroplastic fabric film capable of withstanding the temperature of up to +250° C.

4. Vertical desublimation apparatus (1) according to claim 2, wherein the heat resistant elastic material has a thickness of 100-300 μm.

5. Vertical desublimation apparatus (1) according to claim 1, wherein cold air is passed through the condenser pipes (10, 11) from the condenser intake and discharged into the atmosphere via the condenser exhaust.

6. Vertical desublimation apparatus (1) according to claim 1, wherein the collecting receptacle (12) is a hopper, wherein the hopper comprises an opening arranged below the upstream duct outlets (6) and below the downstream duct inlets (8).

7. Vertical desublimation apparatus (1) according to claim 1, wherein the apparatus (1) comprises a vibrator (17), the vibrator (17) periodically removing crystalline iodine deposited on the inner surface of the upstream and downstream ducts (4, 7) and/or the outer surface of the condenser pipes (10, 11), the removed crystalline iodine being fed into the collecting receptacle (12).

8. Vertical desublimation apparatus (1) according to claim 1, wherein the gas intake (2) comprises a fluoroplastic pipe which is connected to a top part of the apparatus (1), the pipe comprising separate fluid connections (18) for each of the plurality of upstream duct inlets (5).

9. Vertical desublimation apparatus (1) according to claim 1, wherein the upstream section (14) comprises four upstream ducts (4) and three upstream condenser pipes (10).

10. Vertical desublimation apparatus (1) according to claim 1, wherein the downstream section (15) comprises two downstream ducts (7) and one downstream condenser pipe (11).

11. Vertical desublimation apparatus (1) according to claim 1, the apparatus (1) being suspended in a holding frame (19) which is resiliently mounted on the ground.

12. Vertical desublimation apparatus (1) according to claim 1, wherein the apparatus (1) comprises fans (20) for blowing against the outer walls of the apparatus (1).

13. Vertical desublimation apparatus (1) according to claim 1, wherein the gas intake (2) and the gas exhaust (3) are both at a top of the apparatus, and wherein the condenser intake and the condenser exhaust are on opposite upright sides of the apparatus between the top and a bottom of the apparatus.

14. Vertical desublimation apparatus (1) according to claim 1, wherein the at least one upstream condenser pipe and the at least one downstream condenser pipe are both fluidly connected to a common cooling medium source that can be fed through the respective condenser pipes (10, 11).

15. Vertical desublimation apparatus (1) according to claim 13, wherein the condenser intake is fluidly connected to both the at least one upstream condenser pipe and the at least one downstream condenser pipe to feed the common cooling medium source through the respective condenser pipes (10, 11).

16. Vertical desublimation apparatus (1) according to claim 1, wherein the apparatus (1) is suspended in a holding frame (19) that is spring-mounted to the ground with at least one spring, and the apparatus further comprises a vibrator (17) that cooperates with the at least one spring (17) to facilitate periodic removal of crystalline iodine deposited on the inner surface of the upstream and downstream ducts (4, 7) and/or the outer surface of the condenser pipes (10, 11), which the removed crystalline iodine is fed into the collecting receptacle (12).

17. Method for producing crystallized iodine, comprising the steps:
   feeding vapors of water and iodine from an evaporator to the vertical desublimation apparatus (1) of claim 1 at a temperature of 114-184° C., the iodine vapor having a partial pressure lower than the pressure of saturated iodine vapor in the triple point;
   passing the vapors through the upstream and downstream ducts (4, 7) of the apparatus (1), thereby condensing the vapors;
   removing crystalline iodine deposited on the inner surface of the upstream and downstream ducts (4, 7).

* * * * *